Feb. 1, 1966 J. W. RHODES 3,232,049

FLUID INJECTION APPARATUS

Filed May 4, 1962

INVENTOR.
John William Rhodes
BY
Robert E. McClellan
ATTORNEY

United States Patent Office 3,232,049
Patented Feb. 1, 1966

3,232,049
FLUID INJECTION APPARATUS
John W. Rhodes, Indianapolis, Ind., assignor to General Motors Corporation, Detroit, Mich., a corporation of Delaware
Filed May 4, 1962, Ser. No. 192,470
4 Claims. (Cl. 60—35.6)

The invention relates to a fluid injection apparatus and more particularly to a construction for injecting fuel and oxidizer into a rocket motor combustion chamber in a uniform spray pattern at all times.

In liquid fuel rocket engines, better combustion chamber efficiency is generally obtained only by injecting the fuel and oxidizer into the combustion chamber in a uniform spray pattern at all times. Since the chamber pressure in this type of installation varies as a direct function of the fuel flow rate, if the fuel injection pressure remains substantially constant at all times, a change in flow rate as dictated by thrust demands results in a change in the pressure drop across the outlet of the injector resulting in a change in the fuel spray pattern. Prior arrangements have attempted to solve this problem by the use of a plurality of separate valves or other means to control pressure and flow rates, which complicates as well as adds weight and cost to the system.

The invention provides a fuel injection apparatus that provides a uniform fuel spray pattern at all times by maintaining a constant pressure drop across the injector outlet orifice regardless of fluid flow rates and chamber pressure changes. It further provides a construction that is simple and economical to manufacture, and one wherein the entire pressure and flow rate controls are contained within a single valve and the cooperating abutting valve body parts.

Therefore, it is an object of the invention to provide a fluid injection apparatus providing a uniform spray pattern at all times by providing a constant differential between the pressure of the fluid ejected and the pressure in the chamber into which it is injected regardless of the change in fluid flow rates.

It is a further object of the invention to provide a fluid injection apparatus consisting of a single reciprocating fluid flow rate varying valve operating in a constricted valve body bore, the valve and bore having overlapping fluid passages providing a series of variable area fluid controls varied upon movement of the valve to provide the desired differential between the pressure of the fluid ejected and the pressure in the chamber receiving the fluid.

Figure 1:
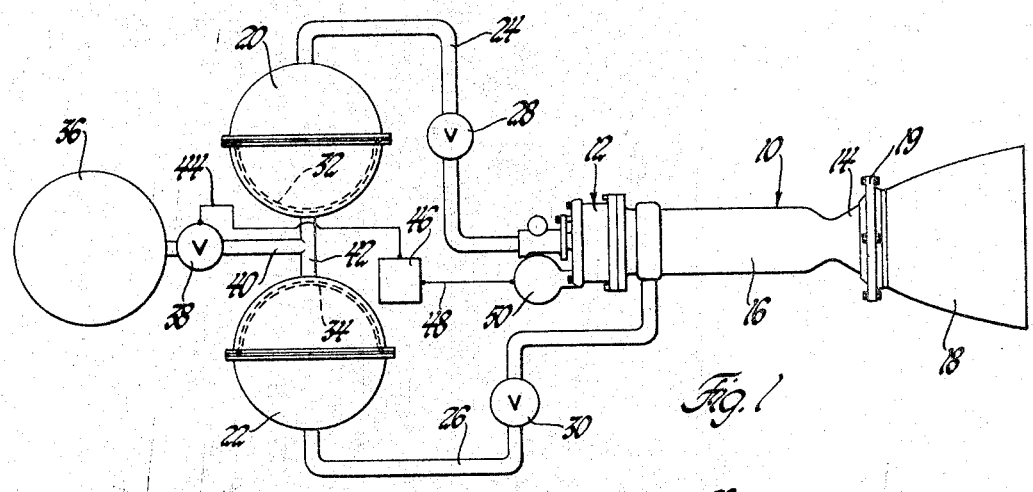
Figure 2:
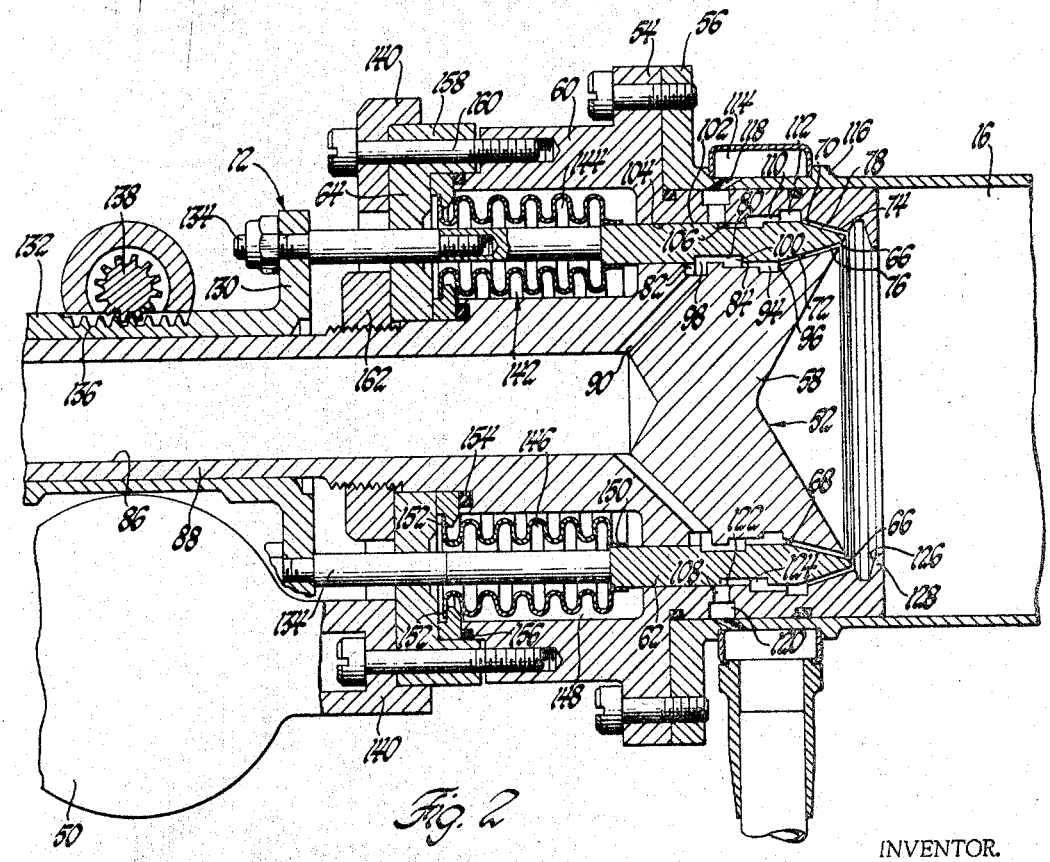

Other objects, advantages and features will become apparent upon reference to the succeeding detailed description of the invention and to the drawing illustrating the preferred embodiment thereof; wherein, FIGURE 1 is a side elevational view of a rocket motor embodying the invention together with a schematic illustration of the fuel and oxidizer supply system therefor; and, FIGURE 2 is an enlarged cross sectional view of details of FIGURE 1.

FIGURE 1 shows schematically a typical installation of the invention in a rocket motor 10. The motor has a cylindrical body portion consisting of a liquid fuel and oxidizer injection apparatus 12 at one end, a non-vectoring exhaust nozzle 14 formed at its opposite end, and a combustion chamber 16 between. The nozzle is a known convergent-divergent type, and has a bell shaped diverging outlet 18 secured to it at flange means 19. The rocket motor is supplied with oxidizer and fuel from suitable tanks 20 and 22 through supply lines 24 and 26 as controlled by shut off valves 28 and 30. The tank may be of a known type containing flexible bladders or diaphragms 32 and 34 acted upon by a suitable gas, such as nitrogen, for example, to pressurize the fluids to the desired level for injection. The gas is contained in a bottle 36 and passes to the tanks through a combination pressure regulator and on-off valve 38 and connecting lines 40 and 42. An engine start-stop control signal line 44 is connected from valve 38 to a control illustrated schematically by the block 46, which in turn is connected by a line 48 to a reversible electric motor 50 for a purpose to be described.

Further details of the rocket motor other than those directed to the injection apparatus 12 will not be given since they are known and are believed to be unnecessary for an understanding of the invention. Suffice it to say, however, that upon receiving a signal from the control 46, fuel and oxidizer are supplied to the injection apparatus from which they are sprayed in the proper proportions into the combustion chamber, and ignited. The products of combustion are then accelerated through the nozzle and expanded out the outlet 18.

FIGURE 2 illustrates the details of the injection apparatus 12. In general, it consists of a metering or flow rate control valve having a pressure control consisting of overlapping relatively movable passages forming a series of fluid restrictions varying in size in proportion to the movement of the valve so that at all times a constant differential is maintained between the chamber pressure of the fluid injected. Thus, a uniform spray pattern is obtained at all flow rates.

More specifically, an anular valve body 52 projects into and is secured to one end of combustion chamber 16 by any suitable means, such as by securing annular flanges 54 and 56 together as shown. The valve body consists of two annular concentric portions 58 and 60 separated by an annular valve 62. The two portions are joined to each other and fixed against relative movement by an annular cover plate 64 in a manner to be described. The valve is adapted to be reciprocated to meter both fuel and oxidizer in the desired amounts to the combustion chamber through an outlet 66.

The valve has a drum-like shape, a section through one portion being for the most part rectangular. The downstream portion of the valve and the adjacent valve body portions are formed to constitute an annular nozzle, the valve surfaces 68 and 70 converging towards each other for cooperation with parallel surfaces 72 and 74 formed on the valve body portions 58 and 60. Two annular angled passages 76 and 78 are thus formed upon opening of the valve, controlling the fluid flow rate as a function of the change in their cross sectional areas with a change in position of the valve.

The valve at its inner diameter has an annular groove 80 constituting a flow passage overlapping a fluid inlet port 82 and passages 84 spaced therefrom in the inner wall of valve body portion 58. Port 82 is annular and receives oxidizer from supply line 24 (FIG. 1) through a central bore 86 in a shaft 88 extending from valve body portion 58, and a connecting bore 90. Passages 84 consist of a set of circumferentially spaced grooves joined at one edge to an annular manifold 94. The edge 96 of the manifold wall is coincidental with the edge of the tapered surface 72 to permit the oxidizer to flow into the outlet 66 through the metering passage 76 upon opening of the valve.

The overlapping arrngement of the port 82 with passage 80 forms a fluid control point or restriction 98 through which the oxidizer must pass, the restriction varying in size in acocrdance with the movement of the valve. The size of passages 80, 84 and manifold 94 are such as to not influence the flow rate or pressure of the oxidizer passing through them. The size of the metering passage 76 controls the oxidizer flow rate, while the restriction 98 controls oxidizer supply and pressure in a manner to maintain a constant pressure drop across the outlet 66 of passage 76, as will be described later.

The outer and inner walls 102 and 104, respectively, of the valve 62 and valve body portion 60 are similarly grooved to control the flow of fuel, the valve having an annular passage 106 overlapping an annular fuel inlet port 108, and a set of circumferentially spaced passages 110 in the valve body portion 60. Passages 110 are joined to an annular manifold 112. Fuel is received in inlet port 108 from supply line 26 through an annular manifold 114 secured to the combustion chamber casing 116, and connecting bores 118 and 120 in the casing and valve body portion 60, respectively. The fluid metering passage 78 controls the fuels flow rate in accordance with movements of the valve, while the fluid restriction 122 controls fuel supply and pressure in the same manner as oxidizer restriction 98 to maintain a constant pressure drop across the outlet 66 of passage 78. For clarity, the passages for the fuel and oxidizer have been shown as unsymmetrically arranged with respect to each other, although it will be clear that they could be symmetrically arranged.

Both the fuel and oxidizer discharge through the angled metering passages 76 and 78 to impinge against the conical face 126 of an annular splatter flange 128 projecting from the valve body portion 60. The face 126 deflects the fluid spray towards the center of the combustion chamber to provide efficient mixing of the two liquids. The angles that the valve surfaces 68 and 70 make with the longitudinal axis of the valve are different as shown to provide for differences in the mass and velocities of the fuel and oxidizer. That is, the resultant angles are such that the fuel and oxidizer will be discharged so that they both impinge upon the splatter plate at the same point, thus providing efficient mixing of the two.

The sizing of the valve converging surfaces 68 and 70 and the corresponding surfaces 72 and 74 of the valve body portions are chosen such that the cross sectional area of the passages 76 and 78 will always be in correct proportion to the flow called for regardless of the opened position of the valve. That is, if the valve is moved to let more fluid out of outlet 66, the diameters of passages 76 and 78 are changed to flow that amount of fluid without restricting it.

As stated previously, combustion chamber pressure varies directly as a function of the change in flow rate of the fluid injected, since burning varies with the amount of fuel and oxidizer supplied. Since the supply pressure in lines 24 and 26 (FIG. 1) remains substantially constant, a change in flow rate of fluid ejected would therefore change the pressure drop across the outlet 66, resulting in a change in the spray pattern and combustion chamber efficiency over that previously obtained. The variable area restrictions 98 and 122 eliminate this difficulty by varying the inlet pressure of the flow to passages 76 and 78 each time the valve is moved in such a manner as always to provide a constant pressure drop across the outlet 66. The valve in moving varies the area of the restrictions to throttle the fuel or oxidizer flow passages in proportion to the change in flow rate so that when the fuel and oxidizer reaches the inlet to the angled passages, they will be at a pressure providing the uniform injection spray pattern.

This can be understood best by consideration of an illustrative condition of operation. Consider the flow of oxidizer alone, since the fuel flow is controlled separately in a similar manner. With the valve in the position shown in FIGURE 2, which corresponds substantially to maximum flow conditions, assume, for example, that after line losses, the pressure of oxidizer in bore 86 is 400 p.s.i., the design combustion chamber operating pressure is 300 p.s.i., and the desired pressure drop across outlet 66 is 60 p.s.i. At full flow, oxidizer passes through inlet port 82 and through passage 80. The restriction 98 between passage 80 and bore 90 at this time is of a size just large enough to effect a pressure drop of 40 p.s.i. across this point, thus placing the pressure of the oxidizer in manifold 94 at 360 p.s.i. The size of passage 76 is at a maximum for this position of the valve, but is correct for the flow rate desired. No pressure change occurs along the passage, and a 60 p.s.i. pressure drop therefore occurs across outlet 66.

Restriction or control 98 is sized so that the same 60 p.s.i. pressure drop occurs at 66 for each movement of the valve towards closing. For example, if only fifty percent thrust is called for, the chamber pressure would then be approximately 150 p.s.i. instead of 300 p.s.i., for the particular flow rate called for. Accordingly, the valve moves to the right as seen in FIGURE 2, both restricting the inlet port 82 to cut down the supply, and causing angled passage 76 to become smaller to be correct for the desired flow of oxidizer. Oxidizer at 400 p.s.i. therefore passes through port 82 and through restriction 98 into passage 80 with a pressure drop of 190 p.s.i. across the restriction, making the pressure in manifold 94 and passage 76, 210 p.s.i. A resultant 60 p.s.i. pressure drop occurs across outlet 66. Other movements of the valve will result in a similar 60 p.s.i. final pressure drop, and therefore, their operations will not be described.

Turning now to the apparatus for reciprocating the valve to its various positions, the valve is secured to the radial flange 130 of a movable sleeve 132 by three rods 134 extending through the cover plate 64. The sleeve is slidably mounted upon shaft 88 and has a rack portion 136 engaged by a pinion 138 connected to the shaft of motor 50 by a reduction gear train (not shown). Motor 50 is mounted on the cover plate by an annular adapter 140. Leakage of air or fuel and oxidizer in opposite directions along the rods and valve is prevented by a seal indicated generally at 142. It consists essentially of outer and inner annular bellows 144 and 146 operating in a recess 148 formed in the valve body portions 58 and 60. Each of the bellows is welded at one end 150 to the valve body and at its other end to an annular retainer 152. The retainers are held against the two body portions by the cover plate 64, seals 154 and 156 preventing leak of fluid at these points. The outer portion of the cover plate has a flange 158 which, together with the adapter 140, is joined to body portion 60 by bolts 160 as shown, thus locating the outer retainer. At its inner diameter, the cover and inner seal retainer are positioned by a spanner nut 162 threadedly engaging the hub of shaft 88.

Energization of motor 50 in either direction by a signal from the stop-start valve 38 (FIG. 1) therefore moves valves 62 in the desired direction collapsing or extending the bellows seals as the case may be to prevent the leakage of fuel or oxidizer outboard of the engine as well as prevent contamination of the system with ambient air.

A detailed overall operation is believed to be unnecessary, since it is now believed to be clear from a consideration of the figures. Suffice it to say, that if the control calls for a change in thrust level, motor 50 will be energized to move valve 62 to the desired position to produce the desired fuel and oxidizer flow rates providing the desired combustion chamber operating pressure, the valve regulating the flows and pressures to maintain the constant pressure drop across the outlet 66.

Therefore, it will be seen that the invention provides a fuel injection apparatus that at all times provides a uniform fluid spray pattern into a combustion chamber by maintaining a constant differential between the pressure of the fuel injected and the pressure of the chamber into which the fluid is injected regardless of the fluid flow rates. This is accomplished by the use of a single valve together with a valve body providing a series of fluid restrictions for varying the pressure and supply of the fluid in accordance with the movement of the valve.

While the invention has been illustrated in the figures for use in connection with a rocket motor, it will be clear to those skilled in the arts to which the invention pertains that it would have uses in many other installations than that shown, and that many changes and modifications could be made thereto without departing from the scope of the invention.

I claim:
1. A fluid injection apparatus for the injection of a propellant into a pressurized combustion chamber in a controlled manner, the pressure in said combustion chamber varying as a direct function of the flow rate of the propellant injected, comprising:
   a supply source of propellant under substantially constant pressure;
   a movable variable area injector for controlling the flow of propellant from said supply source into said combustion chamber;
   and a throttling valve coupled to and movable with said injector, said throttling valve being in series with said injector and being contoured so as to vary the pressure drop through the throttling valve inversely by an amount equal to the variation of combustion chamber pressure attendant upon changes in flow rate of propellant whereby a constant pressure drop is maintained across said injector.

2. A fluid injection apparatus for the injection of a pair of propellants into a pressurized combustion chamber in a controlled manner, the pressure in said combustion chamber varying as a direct function of the flow rate of the propellant injected, comprising:
   a pair of supply sources for said pair of propellants, said supply sources being under substantially constant pressure;
   an annular movable variable area injector having inner and outer circumference surfaces for controlling the flow of said pair of propellants into said combustion chamber, the inner circumference surface of said injector controlling the flow of one of said pair of propellants and the outer circumference surface of said injector controlling the flow of the other of said pair of propellants;
   and an annular throttling valve having inner and outer circumferential valve surfaces coupled to and movable with said annular injector, said throttling valve being contoured on its inner and outer surfaces so as to vary the pressure drop through the throttling valve inversely by an amount equal to the variation of combustion chamber pressure attendant upon changes in rate of propellant whereby a constant pressure drop is maintained across said injector.

3. A fluid injection apparatus as set forth in claim 2 wherein said propellants are fuel and oxidizer.

4. Fluid injection apparatus for the injection of a fuel and oxidizer into a pressurized combustion chamber in a controlled manner, the pressure in said combustion chamber varying as a direct function of the flow rate of the fuel and oxidizer injected comprising:
   a first supply source of fuel under substantially constant pressure,
   a first movable variable area injector for controlling the flow of fuel from said first supply source into said combustion chamber,
   a first throttling valve coupled to and movable with said first injector, said first throttling valve being in series with said first injector and being contoured so as to vary the pressure drop through said first throttling valve inversely by an amount equal to the variation of combustion chamber pressure attendant upon changes in flow rate of fuel, whereby a constant pressure drop is maintained across said first injector,
   a second supply source of oxidizer under substantially constant pressure,
   a second movable variable area injector for controlling the flow of fuel from said second supply source into said combustion chamber,
   a second throttling valve coupled to and movable with said second injector, said second throttling valve being in series with said second injector and being contoured so as to vary the pressure drop through said second throttling valve inversely by an amount equal to the variation of combustion chamber pressure attendant upon changes in flow rate of oxidizer whereby a constant pressure drop is maintained across said injector; and means to fix the ratio of fuel and oxidizer being delivered to said combustion chamber.

References Cited by the Examiner
UNITED STATES PATENTS

| | | | |
|---|---|---|---|
| 977,186 | 11/1910 | Green | 329—423 |
| 1,831,522 | 11/1931 | Bastian | 137—614.11 |
| 2,260,474 | 10/1941 | Mueller | 137—614.11 |
| 2,810,259 | 10/1957 | Burdett | 60—35.6 |
| 2,870,603 | 1/1959 | Long | 60—35.6 |
| 2,995,008 | 8/1961 | Fox | 60—35.6 |
| 3,074,231 | 1/1963 | Klein | 60—35.6 |
| 3,125,121 | 3/1964 | Muller | 137—614.11 |

MARK NEWMAN, *Primary Examiner.*
ABRAM BLUM, SAMUEL LEVINE, *Examiners.*

UNITED STATES PATENT OFFICE
CERTIFICATE OF CORRECTION

Patent No. 3,232,049                                          February 1, 1966

John W. Rhodes

It is hereby certified that error appears in the above numbered patent requiring correction and that the said Letters Patent should read as corrected below.

Column 2, line 29, after "sure" insert -- and the pressure --; line 31, for "anular" read -- annular --; line 66, for "ararngement" read -- arrangement --; same column 2, line 70, for "acocrdance" read -- accordance --; column 3, line 17, for "fuels" read -- fuel --; line 65, for "inlet" read -- inlets --.

Signed and sealed this 17th day of January 1967.

SEAL)
Attest:

ERNEST W. SWIDER                                     EDWARD J. BRENNER
Attesting Officer                                        Commissioner of Patents